United States Patent [19]
Edenfield et al.

[11] Patent Number: 5,197,144
[45] Date of Patent: Mar. 23, 1993

[54] DATA PROCESSOR FOR RELOADING DEFERRED PUSHES IN A COPY-BACK DATA CACHE

[75] Inventors: Robin W. Edenfield; William B. Ledbetter, Jr., both of Austin, Tex.

[73] Assignee: Motorola, Inc., Schaumburg, Ill.

[21] Appl. No.: 484,592

[22] Filed: Feb. 26, 1990

[51] Int. Cl.[5] .............................................. G06F 12/12
[52] U.S. Cl. ............................ 395/425; 364/DIG. 1; 364/243.1; 364/964.2; 364/964.5
[58] Field of Search ... 364/200 MS File, 900 MS File; 395/400 MS File:425 MS File

[56] References Cited

U.S. PATENT DOCUMENTS

| | | | |
|---|---|---|---|
| 4,394,733 | 7/1983 | Swenson | 395/425 |
| 4,445,177 | 4/1984 | Bratt et al. | 364/200 |
| 4,523,206 | 6/1985 | Sassler | 395/425 |
| 4,598,357 | 7/1986 | Swenson et al. | 395/425 |
| 4,858,111 | 8/1989 | Steps | 395/425 |

Primary Examiner—Joseph L. Dixon
Assistant Examiner—Reba I. Elmore
Attorney, Agent, or Firm—Charlotte B. Whitaker

[57] ABSTRACT

A data processor is provided for reloading deferred pushes in copy-back cache. When a cache "miss" occurs, a cache controller selects a cache line for replacement, and request a burst line read to transfer the required cache line from an external memory. When the date entries in the cache line selected for replacement are marked dirty, the cache controller "pushes" the cache line or dirty portions thereof into a buffer, which stores the cache line pending completion, by a bus interface controller, or the burst line read. When the burst line read terminates abnormally, due to a bus error or bus cache inhibit (or any other reason), the data cache controller reloads the copy-back cache with the cache line stored in the buffer. The reloading of the copy-back cache avoids the potential for multiple concurrent exception conditions, and eliminates the problem of unnecessarily removing an otherwise valid cache entry from the cache.

10 Claims, 2 Drawing Sheets

DATA PROCESSOR FOR RELOADING DEFERRED PUSHES IN A COPY-BACK DATA CACHE

FIELD OF THE INVENTION

This invention relates generally to data processors, and more particularly to a data processor having a copy-back data cache.

BACKGROUND OF THE INVENTION

Conservation of external memory bus bandwidth becomes a significant design consideration as microprocessor speeds increase. These faster microprocessors make increasing demands on the memory system, and multiple processors and DMA devices which share the system bus. The M68000 family of microprocessors typically utilize 90-95% of the external bus bandwidth, due to the highly efficient, pipelined internal architecture of the central processing unit (CPU). In some systems, the problem of insufficient bus bandwidth has been addressed by using caching schemes, particularly caches that accommodate large data entries (i.e. significantly larger than the bus size).

Caching schemes have beem employed by computer designers to reduce access times by a CPU to main memory, and hence, increase system performance. In many computing systems, main memory consists of a large array of memory devices with speeds which are slow relative to processor speeds. During accesses to main memory, the processor is forced to insert additional wait states to accommodate the slower memory devices. System performance during memory accesses can be enhanced with a cache. Smaller in size than main memory and significantly faster, the cache provides fast local storage for data and instruction code which is frequently used by the processor. In computing systems with caches, memory operations by the processor are first transacted with the cache. The slower main memory is only accessed by the processor if the memory operation cannot be completed with the cache. In general, the processor has a high probability of fulfilling a majority of its memory operations with the cache. Consequently in computing systems which employ a cache, effective memory access times between a processor and relatively slow main memory can be reduced.

Caches can be highly optimized according to a number of different features. One important feature which affects cache performance and design complexity is the handling of writes by the processor or an alternate bus master. Since two copies of a particular piece of data or instruction code can exist, one in main memory and a duplicate in the cache, writes to either main memory or the cache can result in incoherency between the two storage systems. For example, specific data is stored at a predetermined address in both the cache and main memory. During a processor write to the predetermined address, the processor first checks the contents of the cache for the address. After locating the address in the cache, the processor proceeds to write the new data into the cache at the predetermined address. As a result, the data is modified in the cache, but not in the main memory, and therefore, the cache and main memory become incoherent.

Incoherency between the cache and main memory during processor writes can be handled using two techniques. In a first technique, a "write-through" cache guarantees consistency between the cache and main memory by writing to both the cache and the main memory during processor writes. The contents of the cache and main memory are always identical, and so the two storage systems are always coherent. In second technique, a "write-back" or "copy back" cache handles processor writes by writing only to the cache and setting a "dirty" bit(s) to designate the cache entries which have been altered by the processor. A subsequent attempt by the processor to access the cache, which results in a cache "miss", can cause the replacement algorithm to select the dirty cache entry for replacement, and "push" (transfer) the entire dirty cache entry, or dirty portion thereof, to the main memory. The new data is written into the cache at the location vacated by the dirty entry. Generally, these processors unload dirty cache entries by a burst write transfer of the entire cache line to the main memory. Since the cache entries are significantly larger than the system bus size, the burst write of the entire cache line to the main memory uses a significant portion of the bus bandwidth.

In order to achieve increased performance with minimum bus bandwidth, microprocessors and computer systems are increasing their usage of copy-back data caches. Copy-back data caches may defer pushes of dirty data until the completion of the loading of the replacement cache entry. This procedure of deferring the line "push" pending the completion of the line read from memory requires buffering of the pushed entry. When the line read to load the cache fails due to external bus problems (e.g. bus error or a bus cache inhibit), the performance of the line "push", of the entry being replaced, may cause the occurrence of an additional exception condition (i.e. another bus error). Furthermore, proceeding with the line "push" unnecessarily empties the data cache of an entry which may be needed again, and thus causes a system performance penalty. Consequently, efficient use of the copy-back write strategy requires a mechanism for optimizing the use of the push buffer when the cache load fails due to an abnormal termination of the line read bus transfer.

SUMMARY OF THE INVENTION

Accordingly, it is an object of the present invention to provide an improved data processor for optimizing cache utilization.

It is another object of the present invention to provide an improved data processor having a copy-back data cache capable of deferring pushes of dirty data caused by loading a data cache entry.

Yet another object of the present invention is to provide an improved data processor which eliminates the potential for multiple concurrent exception conditions attributable to maintenance of a copy-back data cache.

These and other objects of the present invention are achieved in a data processor having a bus interface controller, coupled to an external memory, via a system bus, for retrieving a plurality of addressable data entries from the external memory and loading the plurality of addressable data entries into a copy-back cache memory, in response to a line read transfer request from a cache controller, and for transferring a selected dirty addressable data entry from a cache memory temporary holding register to the external memory, in response to a write transfer request from the cache controller. The cache memory is reloaded with the selected dirty addressable data entry upon the occurrence of an abnormal termination of the line read transfer. The line read transfer request and first read address are simultaneously transferred to the bus interface unit, at such a time as the dirty addressable data entry, selected for replacement, is invalidated in the cache memory by the cache controller, and written into the holding register. The selected dirty addressable data entry is reloaded into the cache memory from the holding register, at such a time as the bus interface controller indicates the abnormal termination of the line read transfer, and the selected dirty addressable data entry is revalidated in the cache memory by the cache controller.

DETAILED DESCRIPTION OF THE INVENTION

Figure 1:
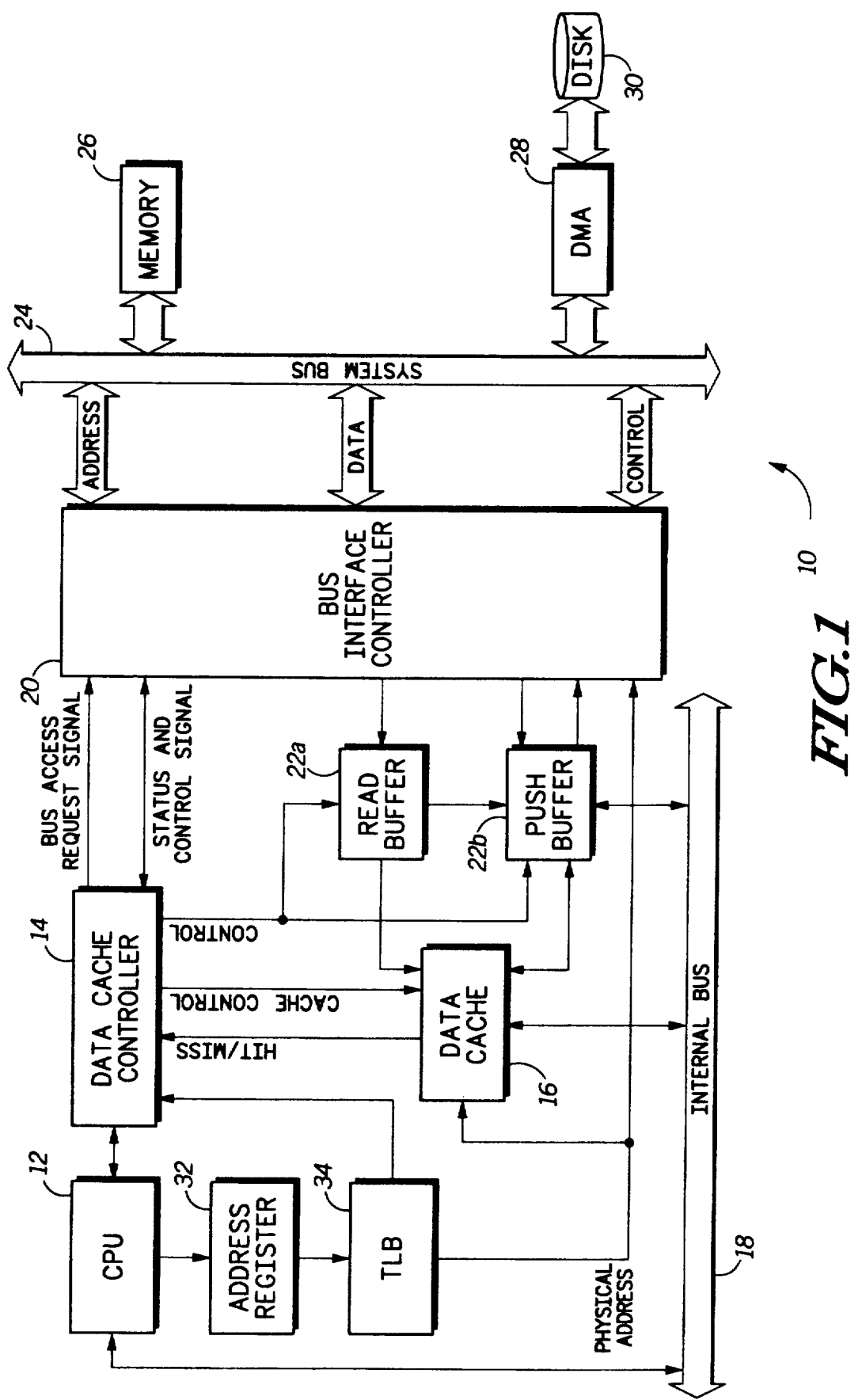
FIG. 1 is a block diagram illustrating an integrated circuit data processing system for implementing the present invention.

Illustrated in FIG. 1 is a block diagram of a preferred embodiment of a data processing system 10 for implementing the present invention, comprising a CPU 12, a data-cache controller 14, a data cache 16, an internal bus 18, a bus interface controller 20, buffers 22, a system bus 24, a main memory 26, a DMA unit 28, and a disk 30, and an address register 32. Data processing system 10 illustrates a typical uni-processor system, utilizing a single cache designed to support the present invention. In the preferred embodiment, the internal bus 18 is n bytes wide, where n bytes is the width of largest natural data type of CPU 12 (i.e. 4 bytes), and the system bus 24 is m bytes wide, where m bytes is the width of a single line of data cache 16 (i.e. 16 bytes). In the illustrated form, CPU 12 is a first internal functional unit having a conventional execution unit for executing a predetermined set of instructions. Data-cache controller 14 is a second internal functional unit which receives control signals from bus interface controller 20, and CPU 12, and manages data transfers between the data cache 16, the CPU 12, and the bus interface controller 20. Data cache 16 is a third functional unit coupled to the data cache controller 14, buffers 22, and the internal bus 18.

Data cache controller 14 also supports bus snooping to maintain coherency between data cache 16 and main memory 26 by monitoring the system bus 24 when CPU 12 is not the current bus master, as disclosed in a U.S. Pat. No. 5,119,485 entitled "A Data Bus Snoop Controller for Concurrent Read and Invalidate Memory Operation", by William Ledbetter et al, and assigned to the assignee hereof. Data cache 16 is a third functional unit coupled to the data cache controller 14, buffers 22, and the internal bus 18. Data cache 16 contains the appropriate logic necessary to read, write, update, invalidate, and flush the cache. In the preferred embodiment, the three internal functional units operate concurrently to provide the maximum sustained performance.

Figure 2:
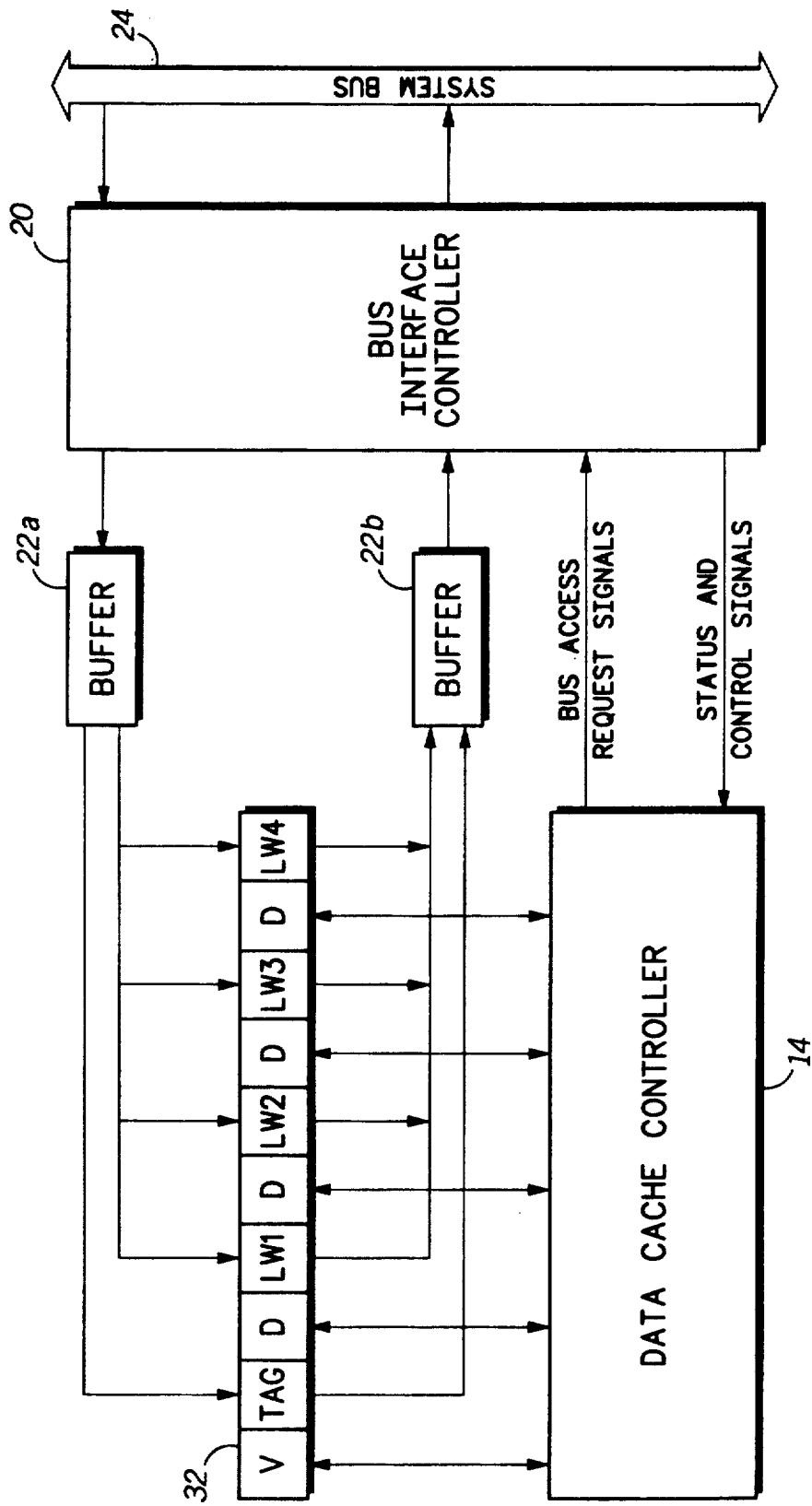
FIG. 2 is a block diagram illustrating a preferred embodiment of the data cache entry replacement scheme in copy-back data cache of FIG. 1, in accordance with the present invention.

In the preferred embodiment, data cache 16 is a 4-way set-associative cache, with sixty-four (64) sets of four (4), 16-byte cache lines, where each cache line comprises four longwords (LW1-LW4), and each longword (LW) consists of thirty-two consecutive bits. Accordingly, data cache 16 has a total storage capacity of 4 KB. Associated with each cache line 32 is an address (TAG) and status information, as shown in FIG. 2. The status information for each cache line 32 consists of the validity per line (first state entry), and the write status—"dirtiness" (second state entry) for each longword (LW) in the data cache line 32. Accordingly, the data cache line 32 has a first VALID (V) bit and a DIRTY (D) bit associated with each longword (LW1-LW4), as illustrated in FIG. 2. There are three possible states for each data cache line 32, VALID, INVALID and DIRTY. When the VALID bit is clear, there is no data stored in the cache line, which signifies an INVALID state. When the VALID (V) bit is set, and no DIRTY bit is set, the data cache line 32 is valid and contains data consistent with the data stored in main memory 26 at the corresponding memory location. When the VALID bit is set, and one of more DIRTY bit(s) are set, the data in the cache line is valid but inconsistent with the memory 26. The use of the multiple DIRTY bits to minimize the number of memory accesses used to unload a dirty cache entry is disclosed in U.S. Pat. No. 5,155,824 entitled "System For Transferring Selected Data Words Between Main Memory And Cache With Multiple Data Words And Multiple Dirty Bits for Each Address", by Robin W. Edenfield et al, and assigned to the assignee hereof.

In the preferred embodiment, data cache 16 supports a copy-back write strategy on a page basis. The copy-back write strategy insures that a modified cache line 32 is "copied back" to memory 24 before it is overwritten by a new cache line. Accordingly, when the page is designated as "copy-back", and a write "hit" occurs in the data cache 16, the CPU 12 will update the matching data cache line 32, and the data cache controller 14 will set the DIRTY bit(s) of the modified longword(s) (LW1-LW4). In so doing, the data cache controller 14 indicates the incoherency between the modified entry in the data cache 16, and the corresponding entry in memory 26. Under the copy-back write strategy, the CPU 12 will not perform a bus write cycle to update memory 24 until the modified cache line 32 is selected for replacement. When a write "miss" occurs in the data cache 16, and the modified data cache line 32 is selected for replacement, the data cache controller 14 pushes the modified (DIRTY) cache line 32 out to memory 24, via push buffer 22b. In the present invention, the modified (DIRTY) cache line 32 is pushed out to memory 24 after the data cache controller 14 retrieves the new data cache line 32 (from memory 24).

In operation, CPU 12 issues a write request to the data controller 14, and concurrently sends the write address to the address register 32. In the preferred embodiment, data cache 16 is a physical cache, therefore, the write address will be translated by a translation look-aside buffer (TLB) 34 to generate a corresponding physical address. TLB 34 translates a predetermined number of the upper address bits of the operand address into a physical address, and concurrently transfers the physical address to the data cache controller 14 and the bus interface controller 20. Data cache 16 also receives the physical address generated by TLB 34, and compares the physical address with a set of tag addresses stored in the data cache 16. In the case where the comparison results in an address match, a cache "hit" occurs, causing data cache 16 to assert a HIT signal to the data cache controller 14. In response to the HIT signal, the data cache controller 14 asserts a CACHE CONTROL signal, thereby enabling the data cache 16 to load the data from the internal bus 18. Upon completion of the cache load, the data cache controller 14 sets the DIRTY bit of the appropriate longword(s) in the data cache line 16. The data cache controller 14 marks (DIRTY) every data cache line 16 written to in this manner. Since CPU 12 will not perform a contemporaneous bus write cycle to update memory 26, the data stored in the modified cache line 32 is now inconsistent with the data stored at the corresponding memory location in memory 26. Thus, at least a portion of data cache line 32 is in a DIRTY state. The modified data cache line 32 will remain in the DIRTY state until the DIRTY data entry is selected for replacement, or is invalidated by CPU 12.

During normal operation, the CPU 12 issues a read or write request to the data cache controller 14 and transfers the corresponding logical address to the TLB 34, via address register 32. As previously described, the logical address is translated into a corresponding physical address for comparison with a selected set of TAG addresses in data cache 16. In the case where the comparison does not result in an address match, a cache "miss" occurs, causing data cache 16 to assert a MISS signal. In response to the MISS signal, the data cache controller uses a replacement algorithm to select a data cache line 32 for replacement. Upon selecting the data cache line 32 for replacement, the data cache controller 14 reads the status information contained in the data cache line 32. When a DIRTY (modified) data cache line 32 (as indicated by the status information) is selected for replacement, the DIRTY data must be "copied back" to memory 24.

Summarily, when the data cache line 32 selected for replacement is DIRTY, the data cache controller 14 pushes the DIRTY data from the selected cache line 32 into push buffer 22b. Concurrently, the data cache controller 14 requests an external bus transfer to perform the cache line read, and thereby retrieve the data cache line 32 required by the CPU 12. The data cache controller 14 asserts a CONTROL signal, thereby pushing (transferring) the data cache line 32 selected for replacement (including the TAG, and status information) out of the data cache 16 and into the push buffer 22b. In so doing, the data cache controller 14 clears the corresponding VALID bit in the data cache 16. Accordingly, the data cache controller 14 loads the DIRTY data into the push buffer 22b and contemporaneously asserts a first BURST READ REQUEST signal. The simultaneous loading of the push buffer 22b, during the external bus cycle for the cache line read, insures that the "push" of the DIRTY data does not stall the CPU 12. Once the push buffer 22b is filled, data cache controller 14 generates BURST WRITE REQUEST signal to bus interface controller 20, thereby requesting a transfer (push) of the information stored in push buffer 22b.

The external bus cycle to write (push) the DIRTY data entry (modified cache line 32) is deferred until the cache line read is complete. Accordingly, in response to the BURST READ REQUEST signal asserted by the data cache controller 14, the bus interface controller 20 transfers the read address to the system bus 24, and indicates a burst read transfer using the memory control (CONTROL) signals. Upon receiving the read address, and burst read CONTROL signals, memory 26 transfers the requested data onto the system bus 24 in predetermined data portions, corresponding to the data bus width. The bus interface controller 20 receives each data portion, via the system bus 24, and transfers the data into the read buffer 22a. After buffer 22a is filled, the bus interface controller 20 is free to accept the BURST WRITE REQUEST ("push" request) made by data cache controller 14, and the data cache controller 14 is free to load data cache 16 with the replacement entry. Data cache controller 14 waits for the bus interface controller 20 to accept the BURST WRITE REQUEST signal, therefore, the data cache line 32 (or a portion thereof) remains stored in push buffer 22b. A set of STATUS signals inform the data cache controller 14 of the status of any bus transfer requested by the data cache controller 14.

When a normal termination of the burst line read occurs, the bus interface controller 20 asserts a first STATUS signal, thereby informing the data cache controller 14 that the burst read transfer of the requested data cache line 32 is completed (error-free). In response to the first STATUS signal, the data cache controller 14 asserts a CONTROL signal, to load the replacement data cache line 32 (stored in the read buffer 22a) into the data cache 16. The replacement data cache line 32, including the TAG and status information is loaded into the data cache 16. The data cache controller 14 sets all DIRTY bits to their appropriate value. Once the bus interface controller 20 accepts the push request, the TAG address and required number of data entries (LW1-LW4) from data cache line 32 are pushed out of buffer 22b into the bus interface controller 20. A minimum amount of the system bus 24 bandwidth is utilized, since only the DIRTY portions of data cache line 32 are "copied-back" to memory 26.

In the present invention, any abnormal termination of the burst line read causes the bus interface controller 20 to assert a second STATUS signal. The second STATUS signal informs the data cache controller 14 of any termination of the burst read transfer that renders the requested data cache line 32 non-cacheable (e.g. bus error, line marked cache inhibited, etc.) The occurrence of a bus error caused by the burst line read request, prevents the data cache controller 14 from loading the data cache 16 with the new data cache line 32 (replacement entry). It is, therefore, unreasonable to proceed with the line "push" of the data cache line 32 selected for replacement, since that would unnecessarily empty an entry in the data cache 16 that may be needed again. Moreover, allowing the line "push" to proceed to the system bus 24 may result in the occurrence of an additional exceptional (e.g. another bus error), and further complicate the exception handling process required to correct the bus error of the burst line read request. Consequently, the bus interface controller 20 waits for the data cache controller 14 to perform certain administrative functions. Upon completion of the administrative functions, data cache controller 14 asserts a third STATUS signal, thereby enabling the bus interface controller 20 to resume normal operation.

Upon receiving the second STATUS signal from the bus interface controller 20, the data cache controller 14 will reload the contents of the push buffer 22b into the data cache 16. Using the TAG address stored in the push buffer 22b, and additional status information, the data cache controller 14 transfers the data cache line 32 back into its original location in data cache 16. The data cache controller 14 determines the proper location for the reload by reading the TAG address and additional state information pointing to the entry to be reloaded in the selected set. Once the data cache line 32 is reloaded, the data cache controller 14 resets the VALID bit (which was cleared when the data cache line was transferred into the push buffer 22b). After the data cache controller 14 reloads the data cache 16, the data cache line 32 remains stored i the data cache 16 until selected for replacement, at a later time While the present invention has been described in a preferred embodiment, it will be apparent to those skilled in the art that the disclosed invention may be modified in numerous ways and may assume many embodiments other than that specifically set out and described above. For example, a reduction in implementation cost of the reload is achieved using the clear and reset of the VALID bit at the proper location in data cache 16, thereby recapturing (revalidating) the data cache line 32 in the data cache 16 after the reload. Thus, the data cache line 32 in the data cache 16 is unaffected except for the VALID bit, which is cleared when the push buffer is loaded, and reset when the data cache 16 is reloaded (upon the occurrence of the abnormal termination of the burst line read). This method of reloading avoids providing a bi-directional path between the data cache 16 and the push buffer 22b, and allows the pushed entry to be revalidated in one clock cycle. It should be apparent to one skilled in the art that the reloading of push buffer 22b may occur as the result of any kind of abnormal termination of the burst line read. Accordingly, it is intended by the appended claims to cover all modifications of the invention which fall within the true spirit and scope of the invention.

We claim:

1. In a data processor having an execution unit for generating requests for a plurality of addressable data entries and a bus interface controller, coupled to a main memory, via a system bus, said bus interface controller retrieving said plurality of addressable data entries from said main memory and loading said plurality of addressable data entries into a copy-back cache memory, in response to a request for a line read transfer generated by a cache controller, and transferring a dirty addressable data entry, selected for replacement by said cache controller, from a first cache memory temporary holding register to said main memory, a method for reloading said cache memory with said dirty addressable data entry, upon an occurrence of an abnormal termination of said line read transfer, comprising the steps of:

providing, via said cache controller, said request for said line read transfer, and simultaneously transferring a first read address provided by said execution unit, to said bus interface controller, at such a time as said dirty addressable data entry is invalidated in said cache memory by said cache controller, and written from said cache memory into said holding register, said first read address corresponding to a first addressable data entry requested by said execution unit;

commencing transfer of said first addressable data entry, corresponding to said first read address, from said main memory to said bus interface controller, via said system bus; and reloading said dirty addressable data entry from said first holding register into said cache memory, if said bus interface controller indicates said abnormal termination of said line read transfer of said first addressable data entry, and revalidating, via said cache controller, said dirty addressable data entry in said cache memory.

2. A method as in claim 1, if the bus interface controller normally terminates said line read transfer of said first addressable data entry, further comprising the steps of:

transferring, via said cache controller, a request for a line write transfer to said bus interface controller, after said dirty addressable data entry is written into said first holding register, thereby requesting a bus transfer of said dirty addressable data entry stored in said holding register;

loading said first addressable data entry from said bus interface controller into a second cache memory temporary holding register, and asserting, via said bus interface controller, a first status signal to thereby inform said cache controller of a normal termination of said line read transfer of said first addressable data entry; and transferring, via said bus interface controller, said dirty addressable data entry from said first holding register to said main memory.

3. A method as in claim 2, if the bus interface controller indicates an abnormal termination of said line read transfer, further comprising the step of transferring a second status signal from said bus interface controller to said cache controller, thereby indicating the occurrence of said abnormal termination of said line read transfer.

4. A method as in claim 3 wherein the step of providing, via said cache controller, said request for said line read transfer, and simultaneously transferring said first read address to said bus interface controller occurs after said cache controller detects a miss in said cache memory.

5. A method as in claim 4 wherein the step of reloading said dirty addressable data entry from said holding register into said cache memory occurs after said cache controller receives said second status signal from said bus interface controller, indicating the occurrence of said abnormal termination of said line read transfer.

6. In a data processor having an execution unit for generating requests for an addressable data entry and a bus interface controller, coupled to main memory, via a system bus, said bus interface controller retrieving a plurality of addressable data entries from said main memory and loading said plurality of addressable data entries into a copy-back cache memory, in response to a request for a line read transfer generated by a cache controller, and transferring a dirty addressable data entry, selected for replacement by said cache controller, from said cache memory to said main memory, a method for reloading said cache memory with said dirty addressable data entry, upon an occurrence of an abnormal termination of said line read transfer, comprising the steps of:

providing, via said cache controller, said request for said line read transfer, and simultaneously transferring a first read address provided by said execution unit, to said bus interface controller, at such a time as said dirty addressable data entry is invalidated in said cache memory and loaded into a first cache memory temporary holding register, said first read address corresponding to a first addressable data entry requested by said execution unit;

commencing transfer of first addressable data entry, corresponding to said first read address, from said main memory to said bus interface controller, via said system bus; and revalidating said dirty addressable data entry in said cache memory when said bus interface controller indicates that said read transfer was abnormally terminated.

7. A method as in claim 6, if the bus interface controller indicates a normal termination of said line read transfer, further comprising the steps of:
- transferring, via said cache controller, a request for a line write transfer to said bus interface controller, after said dirty addressable data entry is invalidated in said cache memory, thereby requesting a bus transfer of said dirty addressable data entry;
- asserting, via said bus interface controller, a first status signal to thereby inform said cache controller of said normal termination of said line read transfer of said first addressable data entry;
- loading said first addressable data entry from said bus interface controller into a second cache memory temporary holding register, in response to said cache controller receiving said first status signal; and
- transferring, via said bus interface controller, said dirty addressable data entry from said first holding register to said main memory.

8. A method as in claim 7, if the bus interface controller indicates an abnormal termination of the line read transfer, further comprising the step of transferring a second status signal from said bus interface controller to said cache controller, thereby indicating the occurrence of said abnormal termination of said line read transfer.

9. A method as in claim 8 wherein the step of providing, via said cache controller, said request for said line read transfer, and simultaneously transferring said first read address to said bus interface controller occurs after said cache controller detects a miss in said cache memory.

10. A method as in claim 9 wherein the step of revalidating said dirty addressable data entry in said cache memory occurs after said cache controller receives said second status signal from said bus interface controller.

* * * * *

UNITED STATES PATENT AND TRADEMARK OFFICE
CERTIFICATE OF CORRECTION

PATENT NO. : 5,197,144

DATED : March 23, 1993

INVENTOR(S) : Robin W. Edenfield and William B. Ledbetter, Jr.

It is certified that error appears in the above-identified patent and that said Letters Patent is hereby corrected as shown below:

Column 8, line 67, after "said", insert --line--.

Signed and Sealed this

Third Day of May, 1994

*Attest:*

BRUCE LEHMAN

*Attesting Officer*     *Commissioner of Patents and Trademarks*